(No Model.)

J. LENTY.
HOSE COUPLING.

No. 476,752. Patented June 7, 1892.

WITNESSES:
F. McArdle
E. Sedgwick

INVENTOR:
J. Lenty
BY Munn & Co.
ATTORNEYS.

UNITED STATES PATENT OFFICE.

JOSEPH LENTY, OF TROY, NEW YORK.

HOSE-COUPLING.

SPECIFICATION forming part of Letters Patent No. 476,752, dated June 7, 1892.

Application filed February 12, 1892. Serial No. 421,283. (No model.)

*To all whom it may concern:*

Be it known that I, JOSEPH LENTY, of Troy, in the county of Rensselaer and State of New York, have invented a new and Improved Hose-Coupling, of which the following is a full, clear, and exact description.

My invention relates to improvements in hose-couplings; and the object of my invention is to produce an extremely cheap and simple coupling, which may be applied quickly and conveniently to any broken hose so as to unite the parts, and which may also be used to advantage in connecting the ends of the several sections of the hose.

To this end my invention consists in a hose-coupling, the construction of which will be hereinafter described and claimed.

Reference is to be had to the accompanying drawings, forming a part of this specification, in which similar figures of reference indicate corresponding parts in both the views.

Figure 1:
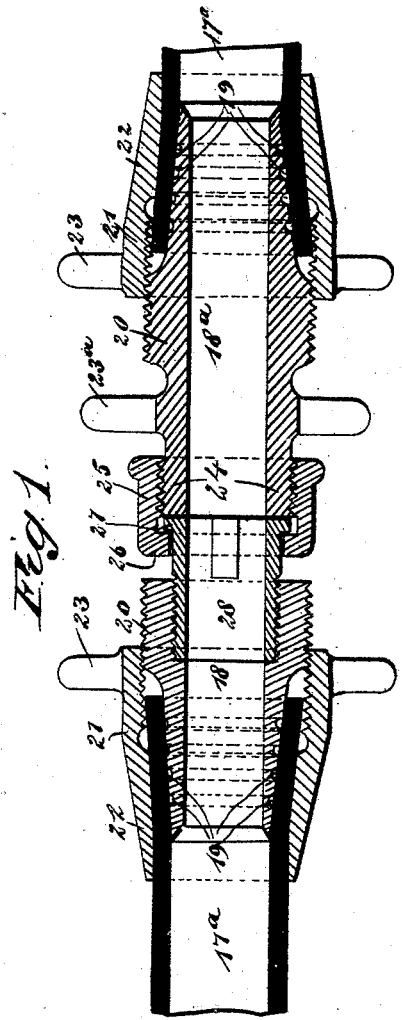
Figure 2:
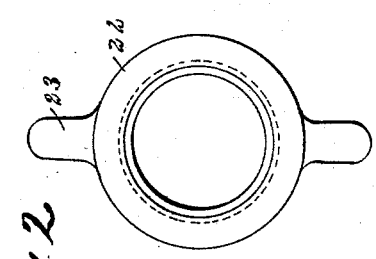

Figure 1 is a longitudinal section of the coupling when used as an ordinary coupling to connect the ends of the hose-sections, and Fig. 2 is an end view of the same.

In my improved coupling hollow plugs 18 and 18$^a$ are employed, each of which has a tapering portion adapted to enter the hose 17$^a$, and produced exteriorly on the tapering portions of the plugs are grooves 19, into which the material of the hose is pressed, so as to prevent the hose from being withdrawn. The plug 18$^a$ has an enlarged threaded end 20, which is adapted to engage the threaded exterior portion of the sleeve-nut 21, which nut has a tapering portion 22, adapted to press upon the hose, and is provided with usual lugs 23 to engage a wrench. The plug 18 is also provided with grooves 19 and with a threaded portion 20, which is adapted to receive a sleeve-nut 21 like that just described, and which has also projecting lugs 23 to enable a wrench to be applied to it in order to assist in tightening the parts. The plug 18$^a$ has also a thickened threaded portion 24 at its free end, which is adapted to engage the locking-sleeve 25, which is similar to the locking-sleeve of an ordinary coupling, and has flanges 26, adapted to engage the flanges 27 of the swivel-block 28, which also is of the usual construction and is adapted to engage the threaded interior portion of the plug 18, the latter plug being recessed at its free end, so that the swivel-block may screw snugly into it. The ends of the hose 17$^a$ are held between the sleeve-nuts and the tapering ends of the plugs, and are clamped in place by tightening the nuts, the material of the hose being forced into the grooves 19, and cannot be accidentally displaced.

The coupling separates by disengaging the threaded end 24 of the plug 18$^a$ from the locking-sleeve 25.

The locking-sleeve may be connected with a hydrant, if necessary, and a nozzle screwed upon the part 24 of the plug, and the swivel-block will be left at the hydrant to prevent the hose from twisting. The end 20 of the plug 18 disconnects from the swivel-block 28 and connects with the threaded end of a metal water-pipe when it is necessary to connect the hose with such a pipe, making a union and gasket unnecessary.

Having thus described my invention, I claim as new and desire to secure by Letters Patent—

A hose-coupling comprising hollow screw-threaded plugs 18 18$^a$, of which the plug 18 is also internally threaded and both having tapering ends, sleeve-nuts screwed upon the plugs and having tapering portions overlapping the tapering ends of the plugs, the flanged swivel-plug 28, screwed into the plug 18, and the locking-sleeve 25, turning upon the swivel-plug and screwed upon plug 18$^a$, substantially as set forth.

JOSEPH LENTY.

Witnesses:
BENJAMIN E. DEGROOT,
MARGARET A. RUSSELL.